United States Patent
Wang

(10) Patent No.: US 7,817,913 B2
(45) Date of Patent: Oct. 19, 2010

(54) FLASH LAMP ASSEMBLY AND PORTABLE ELECTRONIC DEVICE USING SAME

(75) Inventor: Min-Sheng Wang, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 201 days.

(21) Appl. No.: 12/238,547

(22) Filed: Sep. 26, 2008

(65) Prior Publication Data
US 2009/0244879 A1    Oct. 1, 2009

(30) Foreign Application Priority Data
Apr. 1, 2008    (CN)    ................ 2008 1 0300807

(51) Int. Cl.
*G03B 15/03*    (2006.01)
*G03B 15/02*    (2006.01)
*H05B 39/00*    (2006.01)

(52) U.S. Cl. ................ 396/155; 362/10; 340/331
(58) Field of Classification Search ................ 396/155
See application file for complete search history.

(56) References Cited

U.S. PATENT DOCUMENTS

| | | | | |
|---|---|---|---|---|
| 3,319,548 A | * | 5/1967 | Kottler | 396/196 |
| 3,327,106 A | * | 6/1967 | Kottler | 362/10 |
| 4,299,558 A | * | 11/1981 | Pinkasovich | 431/359 |
| 5,565,839 A | * | 10/1996 | Poss | 340/331 |
| 6,492,908 B1 | * | 12/2002 | Cheng | 340/815.73 |

* cited by examiner

*Primary Examiner*—Melissa J Koval
(74) *Attorney, Agent, or Firm*—Steven M. Reiss

(57) ABSTRACT

A flash lamp assembly used in a portable electronic device (100) is described including a supporting member (3) and a flash lamp (4). The portable electronic device includes a printed circuit board (2). The supporting member is mounted on the printed circuit board. The flash lamp is secured on the supported member and supported by the supporting member above the printed circuit board.

12 Claims, 3 Drawing Sheets

FLASH LAMP ASSEMBLY AND PORTABLE ELECTRONIC DEVICE USING SAME

BACKGROUND

1. Field of the Invention

The invention relates to a flash lamp assembly used in a portable electronic device.

2. Description of Related Art

Portable electronic devices incorporating camera modules may include flash lamp assemblies to improve photo quality, by illuminating scenes that do not have enough available light to adequately expose the photograph.

In lower-end consumer photography, flash light assemblies are commonly built directly into the portable electronic device near the camera module. However, this arrangement of the flash lamp assembly is space consuming, which reduces the amount of available space for mounting other electronic components within the portable electronic device.

Therefore, there is room for improvement within the art.

BRIEF DESCRIPTION OF THE DRAWINGS

Many aspects of the exemplary flash lamp assembly and a portable electronic device using the flash lamp assembly can be better understood with reference to the following drawings. These drawings are not necessarily drawn to scale, the emphasis instead being placed upon clearly illustrating the principles of the exemplary flash lamp assembly and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF EMBODIMENTS

Figure 1:
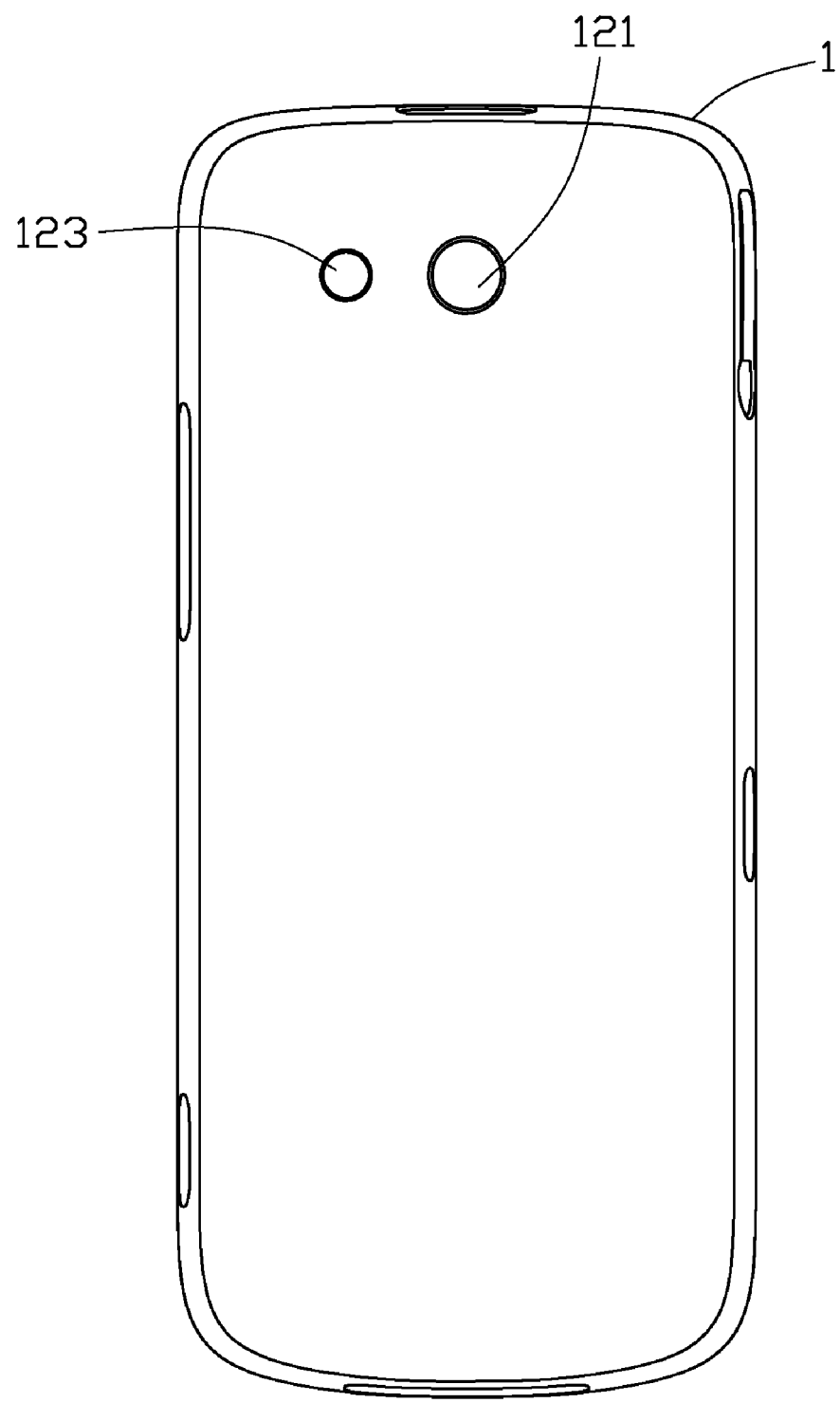
FIG. 1 is an isometric view of a portable electronic device using a flash lamp assembly according to an exemplary embodiment.
Figure 2:
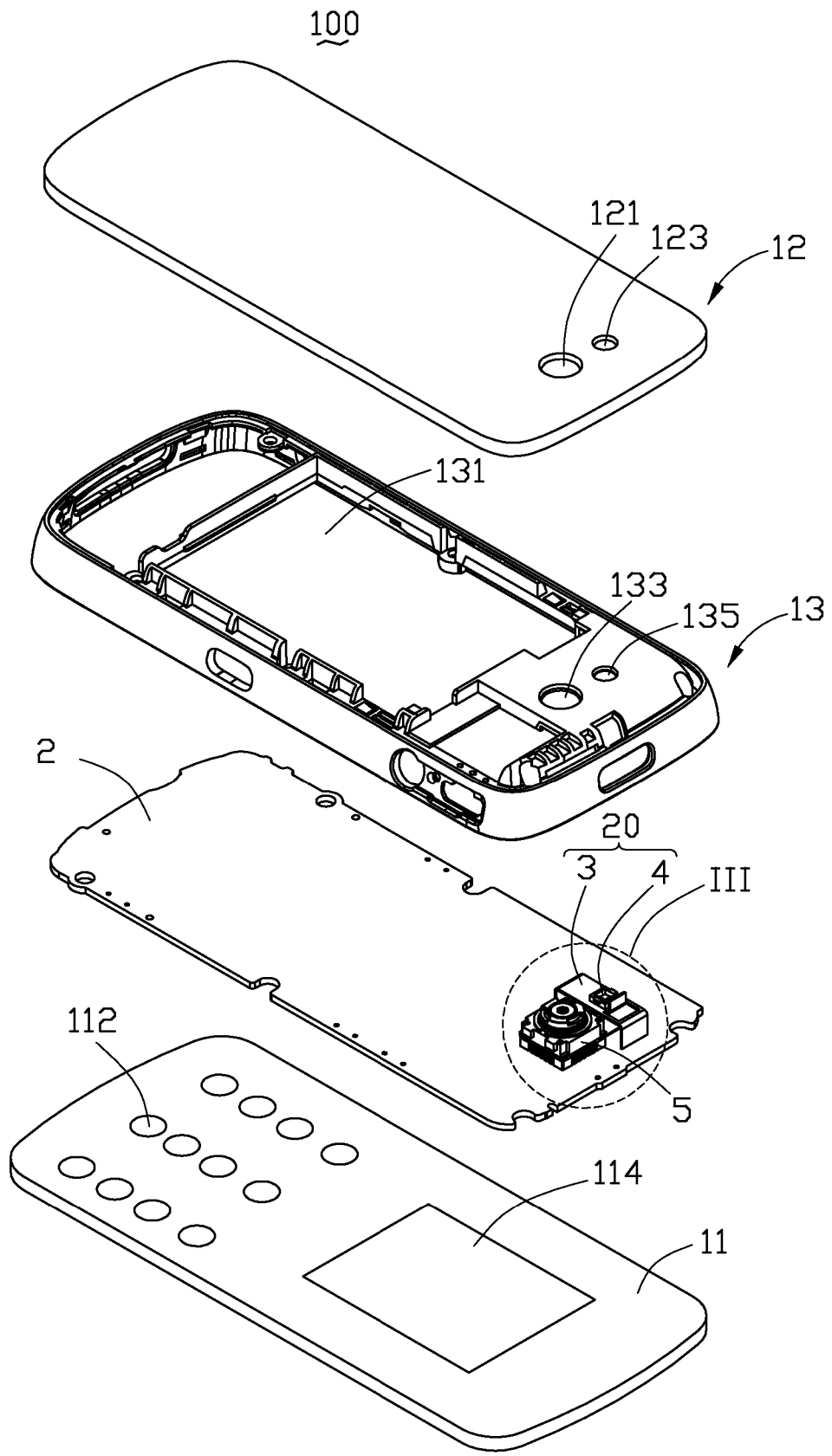
FIG. 2 is an exploded view of the portable electronic device shown in FIG. 1.

FIGS. 1 and 2 show an exemplary portable electronic device 100 including a housing assembly 1, a printed circuit board 2, a camera module 5, and a flash lamp assembly 20 The camera module 5 and the flash lamp assembly 20 are mounted on and electrically connected to the printed circuit board 2, and received in the housing assembly 1.

The housing assembly 1 includes a front cover 11, a back cover 12 and a center portion 13 sandwiched between the front cover 11 and the back cover 12. The front cover 11 defines a display window area 114 and a keys area 112. The back cover 12 defines a first through hole 121 and a second through hole 123 near the first through hole 121. The center portion 13 has a chamber 131 for accommodating a battery (not shown), a barrel hole 133 and a flash lamp hole 135. The barrel hole 133 corresponds to the first through hole 121, and the flash lamp hole 135 corresponds to the second through hole 123.

Figure 3:
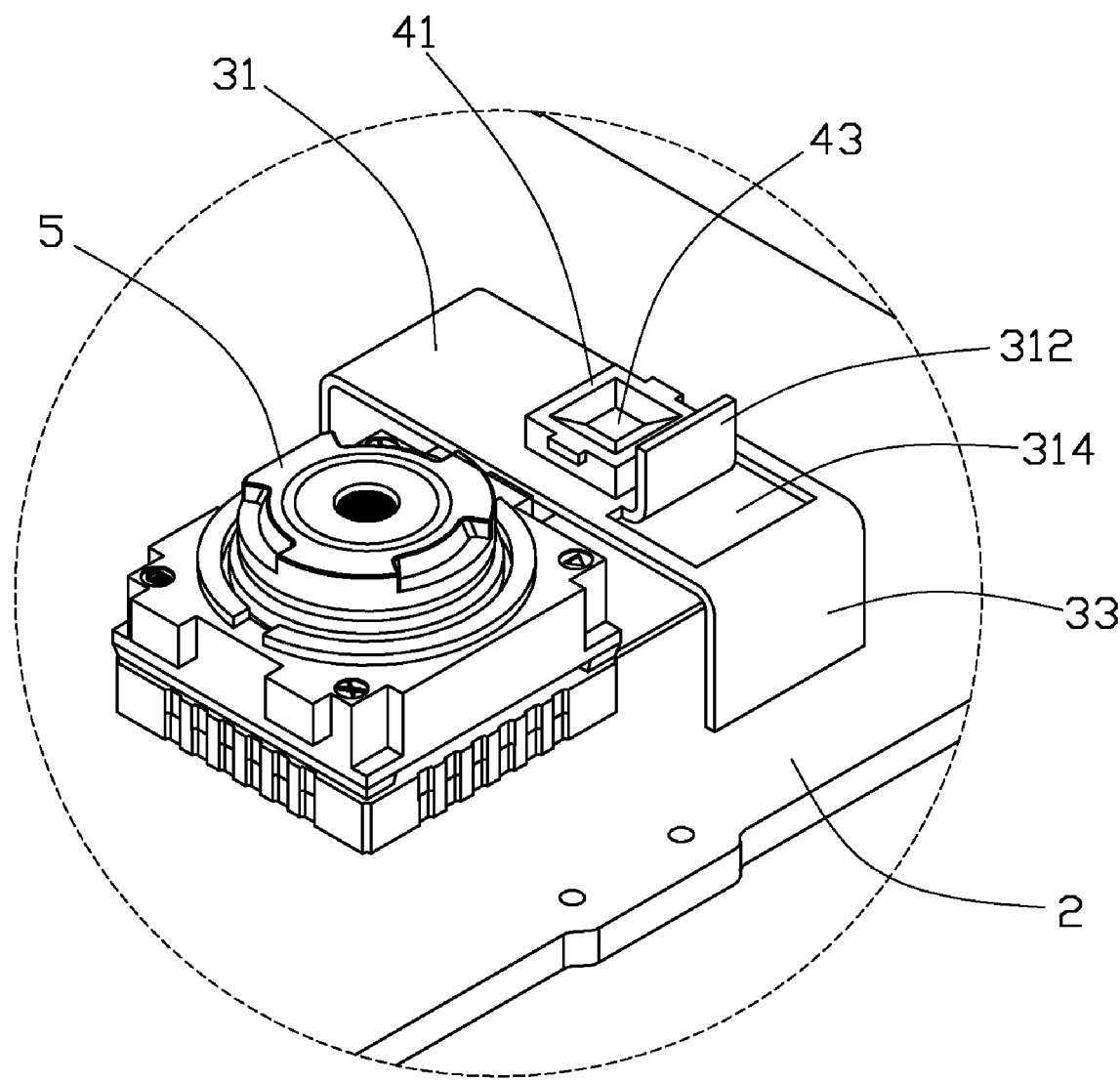
FIG. 3 is an enlarged view of a camera module and the flash lamp assembly shown in FIG. 2.

Referring to FIG. 3, the flash lamp assembly 20 includes a supporting member 3 and a flash lamp 4. The supporting member 3 is generally a rectangular frame including a supporting platform 31 and two parallel supporting legs 33 connected to the printed circuit board 2. Other arrangements are, however, not excluded. For example, the supporting member 3, may have a shape other than rectangular, such as a saw-tooth or wavy. The supporting member 3 is positioned adjacent to the camera module 5. The supporting platform 31 defines an opening 314 towards an end of platform 31 and a bent portion 312 extending away from the opening 314, perpendicular to an edge of the opening 314.

The flash lamp 4 includes a lamp portion 43 and a mounting portion 41. The lamp portion 43 is mounted in the mounting portion 41. The mounting portion 41 surrounds the lamp portion 43. To align the lamp portion 43 with the flash lamp hole 135 and the second through hole 12, the operator can use the bent portion 312 to position the flash lamp 4 relative to the supporting platform 31. Since the flash lamp 4 is mounted on the supporting platform 31 and not directly on the printed circuit board 2, an empty space is defined between the printed circuit board 2 and the supporting member 3. The empty space may be used to position other electronic components therein.

Referring back to FIG. 1, the portable electronic device 100 is in an assembled state. The barrel hole 133 is coaxial with the first through hole 121. The flash lamp hole 135 is coaxial with the second through hole 123. The camera module 5 can be used to capture images through the first through hole 121. The lamp portion 43 aligns with the flash lamp hole 135 and the second through hole 123, and can flash and transmit flashing light through the flash lamp hole 135 and the second through hole 123 to the outside.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flash lamp assembly for a portable electronic device, the portable electronic device including a printed circuit board, the flash lamp assembly comprising:
    a supporting member mounted on the printed circuit board and comprising a supporting platform and two supporting legs connected to the printed circuit board; and
    a flash lamp secured on the supporting platform and supported by the supporting platform above the printed circuit board.

2. The flash lamp assembly as claimed in claim 1, wherein the supporting platform defines an opening and a bent portion extending away from the opening.

3. The flash lamp assembly as claimed in claim 2, wherein the flash lamp comprises a lamp portion and a mounting portion, the lamp portion mounted in and surrounded by the mounting portion.

4. The flash lamp assembly as claimed in claim 3, wherein the flash lamp is located adjacent to the bent portion, and the bent portion separates the flash lamp apart from the opening, the bent portion configured to position the flash lamp relative to the supporting platform.

5. A portable electronic device, comprising:
    a housing assembly;
    a printed circuit board mounted within the housing assembly;
    a camera module mounted on the printed circuit board; and
    a flash lamp assembly comprising:
        a supporting member mounted on the printed circuit board and positioned adjacent to the camera module; and a flash lamp secured on the supported member and supported by the supporting member above the printed circuit board.

6. The portable electronic device as claimed in claim 5, wherein the supporting member comprises a supporting platform and two supporting legs connected to the printed circuit board, and the flash lamp is secured on the supporting platform.

7. The portable electronic device as claimed in claim 6, wherein the supporting platform defines an opening and a bent portion extending away from the opening.

8. The portable electronic device as claimed in claim 7, wherein the flash lamp comprises a lamp portion and a mounting portion, the lamp portion mounted in and surrounded by the mounting portion.

9. The portable electronic device as claimed in claim 8, wherein the flash lamp is located adjacent to the bent portion, and the bent portion separates the flash lamp apart from the opening, the bent portion configured to position the flash lamp relative to the supporting platform.

10. The portable electronic device as claimed in claim 9, wherein:

the housing assembly comprises a back cover and a center portion;

the back cover defining a first through hole and a second through hole;

the center portion defining a barrel hole and a flash lamp hole corresponding to the first through hole and a second through hole, respectively.

11. The portable electronic device as claimed in claim 10, wherein the barrel hole aligns with the first through hole, the flash lamp hole aligns with the second through hole, and the lamp portion aligns with the flash lamp hole and the second through hole by the positioning of the bent portion.

12. The portable electronic device as claimed in claim 11, wherein the camera module is partially received in the barrel hole and configured to receive light penetrated through the first through hole, and the lamp portion aligns with the flash lamp hole and the second through hole 123, and configured to flash and transmit flashing light through the flash lamp hole and the second through hole to the outside.

* * * * *